Jan. 26, 1954 J. B. PRESLEY ET AL 2,667,339
MIXING DEVICE HAVING HOLDER FOR BEVERAGE CUPS
Filed April 2, 1951 2 Sheets-Sheet 1
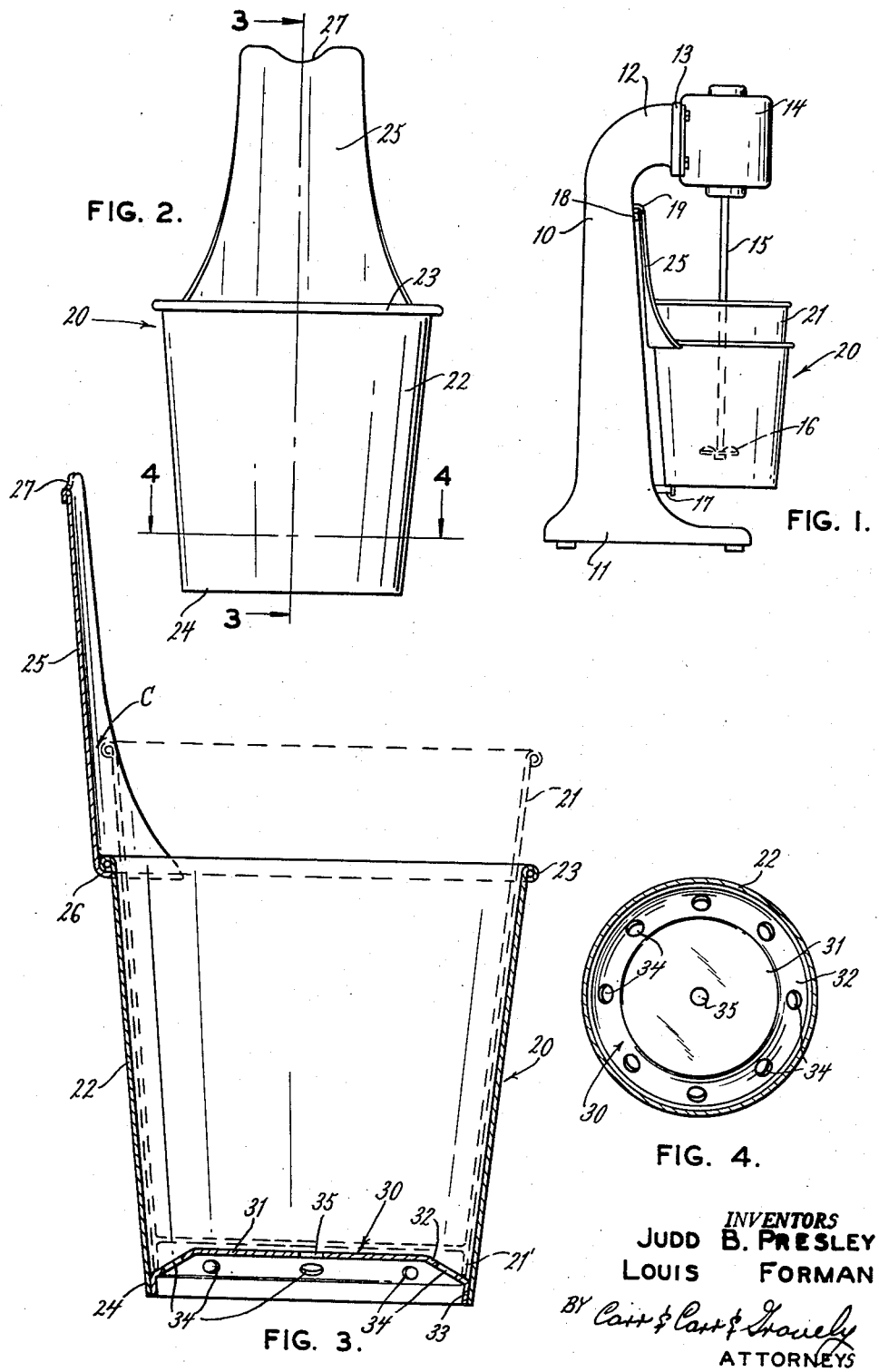
INVENTORS
JUDD B. PRESLEY
LOUIS FORMAN
BY Carr & Carr & Gravely
ATTORNEYS Jan. 26, 1954 J. B. PRESLEY ET AL 2,667,339
MIXING DEVICE HAVING HOLDER FOR BEVERAGE CUPS
Filed April 2, 1951 2 Sheets-Sheet 2

INVENTORS
JUDD B. PRESLEY
LOUIS FORMAN
BY Carr & Carr & Gravely
ATTORNEYS

Patented Jan. 26, 1954

2,667,339

UNITED STATES PATENT OFFICE 2,667,339

MIXING DEVICE HAVING HOLDER FOR BEVERAGE CUPS

Judd B. Presley, Clayton, and Louis Forman, St. Louis, Mo.

Application April 2, 1951, Serial No. 218,794

6 Claims. (Cl. 259—108)

1

This invention relates to beverage mixing apparatus and more particularly to improved holder means for the cups in which the beverage mixing takes place.

Heretofore, it has been a common practice in the mixing of beverages to place the ingredients in a container especially adapted for use with the usual mixing apparatus, and thereafter to dispense the mixed beverage by pouring it from the mixing container into a dispensing container, such as a glass or paper cup. This prior method of mixing and dispensing beverages has necessitated considerable expense in order to maintain a standard of cleanliness which would fully satisfy public health regulations. The maintenance of sanitary conditions involves the thorough washing of the mixing container between each mixing operation, and the more careful washing and sterilizing of the dispensing container when it is of a character permitting its reuse, such as glassware. All of this requires the installation of approved or recommended washing equipment which can meet present day laws regarding standards of health and sanitation.

It is an important object of the present invention to provide a beverage mixing cup holder for use with the usual type beverage mixing apparatus which will avoid the objections heretofore found in connection with the mixing and dispensing of beverages, by permitting the use of single service cups of suitable material for both the mixing and dispensing of beverages.

It is also an object of this invention to provide a holder for beverage mixing cups which will be cheap to manufacture, will maintain the cups in a sanitary condition, and will permit the use of the same cup for both beverage mixing and dispensing.

It is a further object to provide a holder of the above character with means for accommodating it to the use of cups of varying sizes and capacities, such means being in the nature of an adapter fitted to a given size holder and rendering the holder more universally useful.

The invention consists in the provision of a cup holder having a relatively rigid or inflexible body for receiving and supporting a beverage mixing cup, so that the upper portion of the cup is maintained in a sanitary condition by being out of physical contact with the holder or surrounding objects, and an extension or arm carried by the holder body in an offset relation with respect to the upper exposed portion of the cup supported in the holder body, such improved cup holder being adapted for use with the usual mixing apparatus employed in soda fountains, restaurants, and like places generally frequented by the public.

The invention also consists in the parts, and the combination and arrangement of parts hereinafter more particularly described in connection with the accompanying drawing, wherein:

Fig. 1 is a side elevational assembly view of a typical motor operated mixing apparatus showing the presently improved beverage mixing and dispensing cup holder;

Fig. 2 is an enlarged front elevational view of the improved cup holder;

Fig. 3 is a greatly enlarged sectional elevational view of the cup holder taken at line 3—3 of Fig. 2;

Fig. 4 is a transverse sectional view taken at line 4—4 of Fig. 2;

Figure 5:
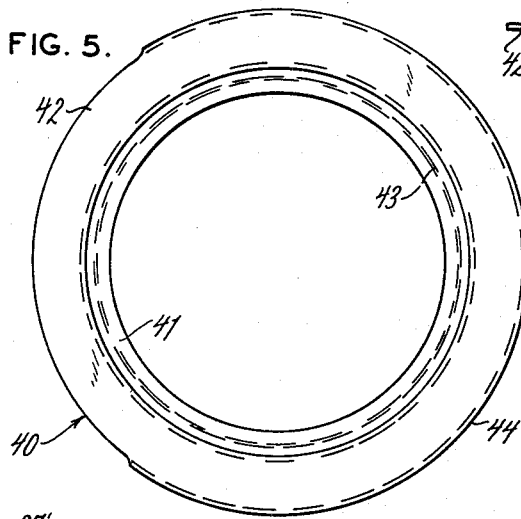
Fig. 5 is a top plan view of an adapter for use in association with the cup holder.

Referring in particular to Fig. 1 of the drawing, the beverage mixing apparatus includes a supporting column type stand 10 having a suitable enlarged base 11 for supporting the same on a counter or other surface. The upper forwardly curved portion 12 of the stand 10 is provided with a bracket flange 13 to which may be secured the frame of an electric motor 14. The motor 14 has its shaft set in a generally vertical position and directly connected with a depending propeller shaft 15 carrying at its lower extremity a well-known mixing agitator 16. The stand 10, near the base portion 11 thereof, is provided with a forwardly extending bracket 17 for supporting the presently improved cup holder at its lower rim. Spaced upwardly from the bracket 17 on the stand 10, and preferably adjacent the electric motor 14, is a control switch 18 suitably protected by a guard plate 19, as is well understood.

The improved cup holder is shown at 20 and a typical beverage mixing and dispensing cup is shown at 21 disposed within the cup holder 20. This mixing and dispensing cup 21 may be formed of a suitable material, not necessarily limited to paper stock such as is utilized commonly for the manufacture of paper drinking cups or of single service cups.

The improved cup holder 20 consists in a tapered or conically formed body 22 having its upper larger diameter end provided with a rolled lip or rim 23 and its bottom end formed as a straight continuation of the side walls of the body to form a lower rim 24. With particular reference to Fig. 3 of the drawing, it will be observed that an upwardly directed relatively rigid arm or extension 25 is carried by the holder body 22 through the provision of an inturned flange portion 26 on the widened lower end portion of the extension. The flange may be formed to fit against and under the rolled rim 23 of the holder body, where it can be attached in any of the well-known ways, such as by brazing or soldering. The upper end portion of the extension 25 is of less width than the lower flanged portion 26 and is provided in its upper edge with a depression or indentation 27 which is intended to engage with the electric motor control switch 18 so as to prevent lateral disengagement or shifting movement of the extension 25. The extension 25 is formed with a curvature which is substantially similar to the curvature of the holder body 22 and the inner surface of this extension is offset rearwardly with respect to the inner surface of the body 22 a distance which will prevent the upper lip or rim portion of the paper cup 21 from coming into contact with the extension 25. This offset relation is indicated at the clearance space provided in the zone C, Fig. 3.

The improved cup holder is further provided with a bottom closure 30 which is made by forming a disc-like partition with a flat central wall surface 31 and a tapered or conic rim 32 which is bounded by a depending flange 33 attached by any of the well-known methods to the adjacent surface of the rim portion 24 of the body 22. This closure member 30 is provided with a plurality of apertures in the rim portion, such as those indicated at 34, and with one or more apertures 35 in the flat central surface 31 thereof. The provision of these apertures enables rapid drainage of the holder after a washing and cleaning operation, so that there is little opportunity for the holder to accumulate dirt and thus become unsanitary.

In connection with Fig. 3, there is disclosed in outline a typical paper or single service cup 21 shown as having its lower rim 21' resting upon the tapered marginal portion or surface 32 of the closure 30. It is also observed that the side wall of the holder is slightly larger in diameter than the adjacent wall of the paper cup 21 so that frosting at the exterior of the cup will not unduly hinder the otherwise free withdrawal of the cup, after mixing a beverage having iced or frozen ingredients. In this connection, the bottom of the paper cup is slightly spaced above the flat surface 31 of the holder closure 30. A slight spacing of the bottom of the paper cup above the inner flat surface of the closure member 30 is desirable, that is for the condition when the paper cup is empty, so that the weight of the ingredients making up the beverage to be mixed will cause the bottom surface of the cup to bow or move downwardly into frictional contact with the bottom closure 30. This flexing of the bottom of the paper cup will provide sufficient frictional contact to prevent rotation of the cup within the body 22, during the mixing operation. This form of the bottom closure 30 will also permit the holder to be used with several sizes of paper cups which vary as to content or capacity.

Figure 6:
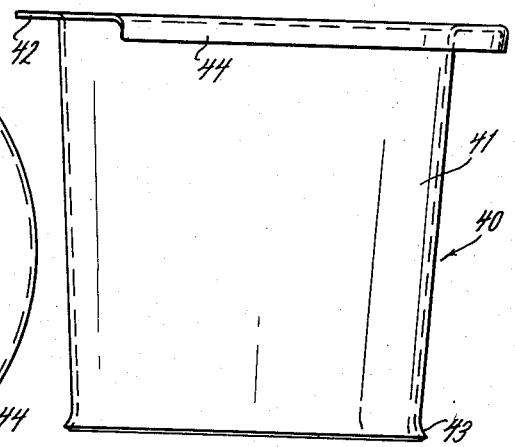
Fig. 6 is an elevational view of the adapter of Fig. 5.
Figure 7:
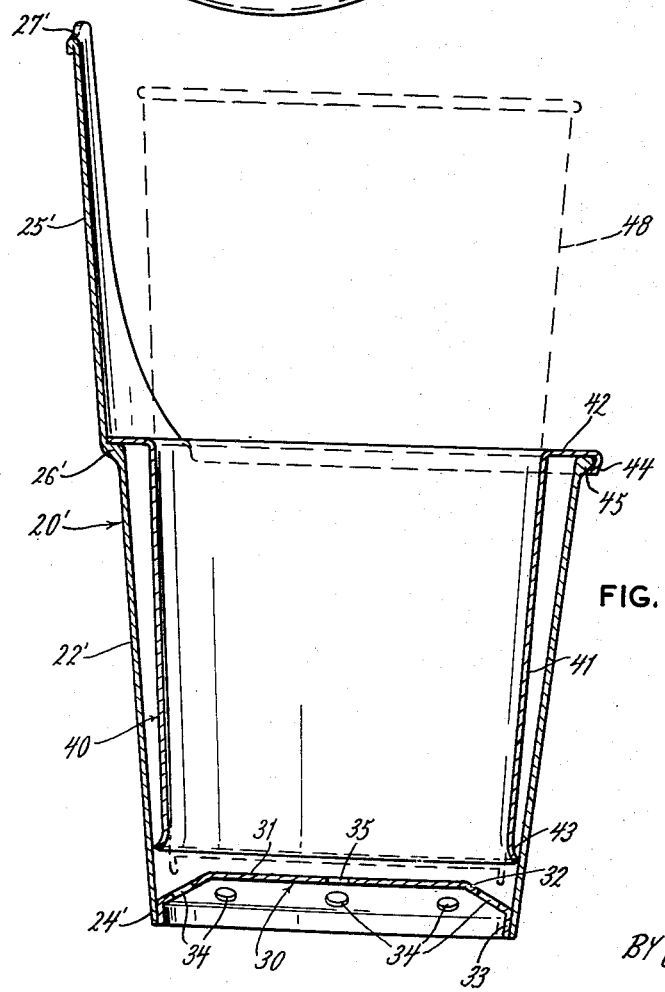
Fig. 7 is a sectional elevational view of an assembled cup holder and cup adapter.

Referring now to Figs. 5, 6 and 7, it will be seen that the present invention also includes the provision of an adapter 40 placed within the modified holder 20' having a body of a one-piece or cast form, as at 22'. Adapter 40 consists of a unitary casting or a fabricated member having a tapering side wall 41 with an annular flanged portion 42 adjacent one end, preferably the larger diameter end thereof, and an enlarged or flared portion 43 at or adjacent its lower end for engagement with the interior surface of the holder body 22', it being the purpose of the flared enlargement to properly position the adapter 40 in and substantially concentrically with the holder body 22'. The adapter 40 is provided with a depending flange lip 44 which is interrupted at the zone or location of the upwardly extending arm 25'. The horizontally directed flange portion 42 forms a complete annular deck, thereby completely covering over the upper end of the space formed between the body 22' and adapter side wall 41. The flange 42 and lip 44 not only support the adapter but improve the appearance of the assembly. The flange lip 44 embraces rim 45 of the holder body 22', except where the extension 25' of the holder 20' connects with the body 22' at the offset portion 26'. The lip 44 may have a snap-fitted relation with the rim 45, to prevent rattle and accidental separation.

In the view of Fig. 7, there has been shown the outline of a paper or single service cup 48 supported in the one-piece holder 22' by means of the adapter 40. Such support of cup 48 is obtained by contact of the cup side wall with the internal surface of the tapering wall 41 of the adapter 40.

It will now be appreciated that the first described cup holder 20 of Fig. 3, or the modified cup holder 20' illustrated in Fig. 7, is adapted to be used in connection with a paper or single service cup which may be sufficiently large to fit directly in either holder 20 or 20'. On the other hand, the cup may be so reduced in size as to require support through the medium of the adapter 40.

The adapter thereby extends the use of one holder to a series of cup sizes. As an example of the utility possessed by the presently improved holder and cooperating adapter, a practical commercial construction for either form of the holder has been predicated upon its use with a one pint capacity paper cup or container of the type commercially available.

It should be understood, that the holder 20' may be constructed as a one-piece sheet metal member, or as a casting, with the bottom closure 30 separately formed and assembled. On the other hand, holder 20 is a multi-part structure in which the body, extension and bottom closure are separately formed. It should also be understood that either form of the holder, as well as the adapter 40, may be formed from metal, plastics, or plastic impregnated materials.

The presently described holder 20 may be constructed from any of the suggested variety of materials, with the principle of having such material impart a desired degree of strength and rigidity to retain its shape and relieve the paper cup placed therein of any duty to actuate the control switch 18 or sustain any loads, other than to support the ingredients to be mixed therein. The extension not only acts to operate the motor control switch 18, but conveniently functions as a handle when needed.

Whenever the term cup is used or referred to in the description and claims, it shall be understood to mean a cup made of paper or other equivalent material rendered moisture repellent, or it shall be taken to mean a cup made or formed of a moisture repellent material limiting its use to a single service application.

Having now described the invention in connection with a preferred embodiment it should be understood that certain modifications and changes may be made herein without departing from the intended scope of the invention as defined by the appended claims.

We claim:

1. For use with a mixing and serving cup, the improvement which comprises a holder adapted to receive the cup, said holder comprising a body having a tapering side wall with the larger upper open end defined by a rim, an extension on said body laterally offset from the interior of the body and extending upwardly from the body rim, and a cup supporting adapter disposed in said body, said adapter having a support flange adjacent one end for engaging upon said body rim and an enlarged guiding portion adjacent its other end for engaging the tapering side wall surface of said body.

2. In beverage mixing apparatus including a cup in which mixing is done by a motor driven mixer supported on a stand in cooperation with a control switch for the motor thereof: the improvement of a sanitary holder adapted to receive the cup, said holder being removably associated with the apparatus, said holder consisting of a tapering body adapted to support the cup with the cup lip portion free of contact with the body, and a control switch actuating extension on said body extending above and in offset relation relative to said holder body and adapted to be spaced from the lip portion of the cup when inserted therein.

3. In beverage mixing apparatus including a cup in which mixing is done by a motor driven mixer supported on a stand in cooperation with a control switch for the motor thereof: the improvement of a sanitary beverage mixing cup holder removably associated with the apparatus, said holder consisting of an open top body adapted to receive the cup therein for beverage mixing with the cup lip portion out of contact with the body, a control switch actuating extension on said body extending above and in outwardly offset relation with said holder body and adapted to be spaced from the beverage mixing cup, and a bottom closure for said body adapted to support the beverage mixing cup adjacent the bottom rim of the latter.

4. In beverage mixing apparatus including a cup in which mixing is done by a motor driven mixer supported on a stand in cooperation with a control switch for the motor thereof: the improvement which consists in a sanitary holder body adapted to receive a cup loosely fitting the interior of the body, an extension on said body directed upwardly and into operating engagement with the motor control switch, and a cup supporting adapter for said body, said adapter having a guide portion engaging the interior surface of said body and a flange portion engaging said body to support the adapter thereby.

5. The improvement set forth in claim 4, wherein said holder body tapers from a cup receiving open end to a bottom closed end, and said adapter tapers similarly with said holder body from said flanged support to said guide portion.

6. For use with a mixing and dispensing cup, a mixing and dispensing cup holder, said holder consisting in a tapered body having its smaller end closed and its larger end opened and adapted to receive the cup therein in slightly loosely fitting relation to the interior of the body and resting on the closed end thereof, a cup supporting adapter for and disposed in said tapered body, said adapter having a guide portion engaging the interior surface of said body and a flange portion engaging said body to support the adapter thereby, and an extension on said body in offset relation to the interior of said body, said extension projecting upwardly from the larger open end thereof.

JUDD B. PRESLEY.
LOUIS FORMAN.

References Cited in the file of this patent

UNITED STATES PATENTS

| Number | Name | Date |
|---|---|---|
| 924,135 | Blenckstone | June 8, 1909 |
| 1,361,364 | Burlingham | Dec. 7, 1920 |
| 1,389,594 | Moore | Sept. 6, 1921 |
| 2,004,373 | Lutes | June 11, 1935 |
| 2,136,355 | Fredenhagen et al. | Nov. 8, 1938 |
| 2,294,489 | Terry | Sept. 1, 1942 |
| 2,419,416 | Mustain | Apr. 22, 1947 |
| 2,518,538 | Giblin | Aug. 15, 1950 |